United States Patent [19]
Quinn

[11] 3,805,804
[45]* Apr. 23, 1974

[54] METHOD OF IMPROVED TOBACCO PRODUCT CONTAINING PHENYL-PENTENALS

[75] Inventor: Alton Dewitt Quinn, Abrahamsville, Pa.

[73] Assignee: International Flavors & Fragrances, Inc., New York, N.Y.

[ * ] Notice: The portion of the term of this patent subsequent to Sept. 26, 1989, has been disclaimed.

[22] Filed: Aug. 1, 1972

[21] Appl. No.: 276,921

[52] U.S. Cl. .................................. 131/144, 131/17
[51] Int. Cl. ........................................... A24b 15/00
[58] Field of Search ............... 131/17 R, 144 R, 17; 99/140 R

[56] References Cited
UNITED STATES PATENTS

| | | | |
|---|---|---|---|
| 3,402,051 | 9/1968 | Roberts | 131/144 X |
| 3,694,232 | 9/1972 | Hall et al. | 90/140 R |
| 3,288,146 | 11/1966 | Bauley et al. | 131/266 X |
| 3,582,360 | 6/1971 | Praag et al. | 99/140 R |

Primary Examiner—Melvin D. Rein
Attorney, Agent, or Firm—Brooks, Haidt & Haffner, Arthur L. Liberman

[57] ABSTRACT

Novel tobacco and tobacco flavor compositions having intense and full bodied cinnamon and/or fruity notes produced by adding thereto 3-phenyl-3-pentenal and/or 3-phenyl-2-pentenal and methods for preparing said compositions.

3 Claims, No Drawings

METHOD OF IMPROVED TOBACCO PRODUCT CONTAINING PHENYL-PENTENALS

BACKGROUND OF THE INVENTION

The present invention relates to organoleptically improved tobacco products, additives for such products and methods of making same.

Desired natural tobacco flavors are generally obtained in smoking tobacco products by carefully selecting and blending tobacco leaf materials of the desired types and quality which have been cured in a prescribed manner. Other desirable organoleptic characteristics are imparted thereto by the addition of various casing and flavoring materials.

This procedure for obtaining the desired natural tobacco organoleptic characteristics presents a number of problems. Thus, it is desirable that a specified brand of cigarettes or other tobacco product always have the same natural tobacco flavor and aroma so that the consumer smoking that brand can rely on the uniform organoleptic characteristics thereof. Any variations in the organoleptic characteristics of any one or more of the component tobacco materials in the blend will result in variations in the taste and aroma of the cigarette or other tobacco product. In the growing of any plant product, such as tobacco, variations inevitably occur from crop to crop and field to field depending on many different factors, such as variations in soil conditions or in fertilizers, differences in rainfall, sunshine and temperature, and variations in genetic strains. Where attempts are made to compensate for differences in the natural characteristics of the tobacco components in the blend by varying the types of components or proportions in the blend, further problems arise due to individual human differences in taste and smell.

The problem is further complicated by variations and deterioration in the aroma and flavoring characteristics of certain types of tobacco in recent years.

Attempts to compensate for such variations in natural tobacco flavor and aroma characteristics by varying the casing and flavoring additives of the type heretofore employed might serve to mask or conceal such variations or to impart other flavoring characteristics thereto, but they would not serve to enhance and to make uniform the desired natural tobacco organoleptic characteristics.

The production of tobacco having an intense fruity note as one of its organoleptic characteristics has, in the past, been difficult to produce so that a natural full bodied aroma is achieved in smoking. Thus, in the past, formulations containing maltol, gamma undecalactone, benzaldehyde, amyl acetate, and other esters, such as ethyl butyrate and ethyl acetate and unsaturated aliphatic alcohols, such as hexen-2-ol-1 have been used to provide fruit flavors for tobacco but such fruit flavors have been lacking an ingredient which would give rise to a natural full bodied fruit flavor and aroma. It has now been found that 3-phenyl-3-pentenal when used in a proportion of approximately 10–40 percent of the overall tobacco flavor will cause such tobacco flavor to have a much more natural full flavored aroma and will, by the same token, cause tobaccos to which such flavor is added to have intense natural full bodied fruity notes on smoking.

In the past, formulations including cinnamaldehyde, eugenol, natural oils, such as celery seed oil, Bergamot oil, nutmeg oil, and origanum oil and hydrocarbons, such as dipentene have been used to provide cinnamon flavors to tobacco so that a cinnamon note would be obtained on smoking said tobacco. Such cinnamon flavors have been noted to lack the full bodied natural notes provided by the natural cinnamon products. It has now been found that when adding from 10 to 40 percent by weight of 3-phenyl-2-pentenal, the same natural full bodied cinnamon aroma provided by natural cinnamon is imparted to smoking tobacco.

3-Phenyl-3-pentenals have previously been suggested in United States Patent Application Ser. No. 43,555, filed June 4, 1970 for use in cocoa flavors whereby notes characteristic of milk chocolate are provided. 3-Phenyl-4-pentenal, for example, is indicated to cause the chocolate beverage to have a fuller, richer sweet milk chocolate flavor. U.S. Pat. No. 3,582,360 issued on June 1,1971 discloses a certain 2-phenyl-2-alkenals as being useful for preparing food flavoring compositions, particularly those having chocolate or cocoa flavors and/or aroma qualities.

Cinnamaldehyde is reported in "Perfume and Flavor Chemicals (Aroma Chemicals)" by S. Arctander (published by the author in Montclair, New Jersey) as having a "sweet and warm-spicy taste with little or no pungency at normal use level...Extensively used in flavor compositions...it has later entered mouthwash, dentifrice and candy flavors in the shape of many different flavor types; spice, cinnamon,...". Arctander, in Volume II, discloses at No. 1951 the use of 2-methyl-3-phenyl-2-propenal as a "powerful, sweet-herbaceous, but primarily cinnamon-spicy, warm odor of moderate tenacity. Sweeter and less pungent than cinnamic aldehyde, more hay-like and floral than that aldehyde...It is also used in flavor compositions, mainly for spice blends."

THE INVENTION

This invention provides an organoleptically improved smoking tobacco product and additives therefor, as well as methods of making the same which overcome the problems heretofore encountered and in which specific desired natural fruity and/or cinnamon flavoring characteristics of tobacco are created or enhanced and may be readily controlled and maintained at the desired uniform level regardless of variations in the tobacco components of the blend.

This invention further provides improved tobacco additives and methods whereby various desirable fruity and/or cinnamon flavoring characteristics may be imparted to smoking tobacco products and may be readily varied and controlled to produce the desired uniform flavoring characteristics.

In carrying out my invention I add to smoking tobacco material or a suitable substitute therefor (e.g. dried lettuce leaves) an aroma and flavor additive containing as an active ingredient one or both of the following materials:

1. 3-Phenyl-3-pentenal;
2. 3-Phenyl-2-pentenal. I prefer to employ an aroma and flavoring additive containing as an active ingredient one of the foregoing 3-phenyl-pentenals in either the "cis" form or the "trans" form or mixtures of the "cis" and "trans" forms. Furthermore, mixtures of 3-phenyl-2-pentenal in the "cis" and/or "trans" forms and 3-phenyl-3-pentenal in the "cis"

form and/or "trans" form may be used as a blend.

In addition to the 3-phenyl-pentenals of my invention other flavoring and aroma additives may be added to the smoking tobacco material or substitute therefor either separately or in mixture with the 3-phenyl-pentenals as follows:

I Synthetic materials
  β-Ethyl-cinnamaldehyde
  Eugenol
  Dipentene
  Maltol
  Ethyl maltol
  Delta undecalactone
  Delta decalactone
  Benzaldehyde
  Amyl acetate
  Ethyl butyrate
  Ethyl acetate
  2-Hexenol-1-2-methyl-5-isopropyl-1,3-nonadiene-8-one
  2,6-Dimethyl-2,6-undecadiene-10-one
  2-Methyl-5-isopropyl acetophenone
  2-Hydroxy-2,5,5,8a-tetramethyl-1-(2-hydroxyethyl)-decahydronaphthalene.
  Dodecahydro-3a-6,6,9a-tetramethyl naphtho-(2,1-b)-furan
  4-Hydroxy hexanoic acid, gamma lactone
  Polyisoprenoid hydrocarbons defined in Example V of U.S. Patent 3,589,372, issued on June 29, 1971

II. Natural Oils
  Celery seed oil
  Bergamot oil
  Nutmeg oil
  Origanum oil

An aroma and flavoring concentrate containing 3-phenyl-3-pentenal or 3-phenyl-2-pentenal and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g. lettuce leaves) or mixtures thereof. The proportions of flavoring additives may be varied in accordance with taste but insofar as enhancement or the imparting of fruity and-/or cinnamon notes, I have found that satisfactory results are obtained if the proportion by weight of the sum total of 3-phenyl-pentenals to smoking tobacco material is between 0.01 and 0.40 percent of the active ingredients to the smoking tobacco material. I have further found that satisfactory results are obtained if the proportion by weight of the sum total of 3-phenyl-pentenals used to flavoring material is between 10 and 40 percent.

Any convenient method for incorporating the 3-phenyl-pentenals in the tobacco product may be employed. Thus, the 3-phenyl-pentenals taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of the 3-phenyl-pentenals taken alone or taken further together with other flavoring additives as set forth above, may be applied by means of a suitable applicator such as a brush or roller on the paper or leaf wrapper for the smoking product, or it may be applied to the filter by either spraying, or dipping or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the 3-phenyl-pentenals in excess of the amounts or concentrations above indicated so that when blended with other tobaccos, the final product will have the percentage within the indicated range.

In accordance with one specific example of my invention, an aged, cured and shredded domestic burley tobacco is spread with a 20 percent ethyl alcohol solution of a mixture of "cis" and "trans" 3-phenyl-3-pentenal in an amount to provide a tobacco composition containing 0.15 percent by weight of 3-phenyl-3-pentenal on a dry basis. Thereafter, the alcohol is removed by evaporation and the tobacco is manufactured into cigarettes by the usual techniques. The cigarette when treated as indicated has a desired and pleasing aroma which is detectable in the main and side smoke streams when the cigarette is smoked. This aroma is described as a "fruity" aroma.

In accordance with another specific example of my invention, an aged, cured and shredded domestic burley tobacco is spread with a 25 percent ethyl alcohol solution of a mixture of "cis" and "trans" 3-phenyl-2-pentenals in an amount to provide a tobacco composition containing 0.10 percent by weight of the 3-phenyl-2-pentenal on a dry basis. Thereafter, the alcohol is removed by evaporation and the tobacco is manufactured into cigars by the usual techniques. The cigar when treated as indicated has a desired and pleasing aroma which is detectable in the main and side smoke streams when the cigar is smoked. The aroma is described by cigar smokers as "natural cinnamon-like".

While my invention is particularly useful in the manufacture of smoking tobacco, such as cigarette tobacco, cigar tobacco and pipe tobacco, other tobacco products formed from sheeted tobacco dust or fines may also be used. Likewise the 3-phenyl-pentenals of my invention can be incorporated with materials such as filter tip materials, seam paste, packaging materials and the like which are used along with tobacco to form a product adapted for smoking. Furthermore, the 3-phenyl-pentenals can be added to certain tobacco substitutes of natural or synthetic origin (e.g. dried lettuce leaves) and, accordingly, by the term "tobacco" as used throughout this specification is meant any composition intended for human consumption by smoking or otherwise, whether composed of tobacco plant parts or substitute materials or both.

The 3-phenyl-3-pentenal contemplated for use in the practice of my invention is synthesized by first preparing 3-phenyl-4-pentenal in a procedure described in co-pending United States Patent Application Ser. No. 43,555, filed on June 4, 1970 or described by Burgstahler J. Chem. Soc., 1963, pages 4986-9 [see paragraph 2 on page 4989]. A di-lower alkyl or lower alkylene acetal is produced therefrom by reacting the 3-phenyl-4-pentenal with a lower alcohol or with a lower alkylene glycol in the presence of an acid catalyst, such as paratoluene sulfonic acid, hydrochloric acid or a source therefor, such as acetyl chloride. Reaction of such trialkyl orthoformates as triethyl orthoformate with 3-phenyl-4-pentenal will also give rise to the production of a dialkyl acetal of 3-phenyl-4-pentenal. The resulting acetal of 3-phenyl-4-pentenal is then treated with a base, such as potassium-t-butoxide whereby a 3-phenyl-3-pentenal acetal is formed. The resulting 3-phenyl-3-pentenal acetal is then hydrolyzed in a concentrated mineral acid, such as concentrated hydrochloric acid thereby yielding 3-phenyl-3-pentenal.

The 3-phenyl-2-pentenal contemplated for use in the practice of my invention is synthesized by means of reaction of propiophenone with the lithium salt of a Shiff base of acetaldehyde (e.g. a Shiff base of acetaldehyde with cyclohexylamine) thereby forming a 3-phenyl-2-pentenal Shiff base. This Shiff base is then hydrolyzed thus forming the 3-phenyl-2-pentenal free aldehyde.

The Examples set forth supra and infra are given to further illustrate embodiments of the invention as it is presently preferred to practice it. It will be understood that these examples are illustrated and the invention is not to be considered as restricted thereto except as indicated in the appended claims.

EXAMPLE I

Preparation of 3-phenyl-4-pentenal dimethyl acetal 18 grams of 3-phenyl-4-pentenal produced according to the procedure Burgstahler J. Chem. Soc. 1963, pages 4986–4990 is admixed with 16 grams of Linde 3A molecular sieves 1/16 inch pellets purchased from the Matheson, Coleman & Bell Co., East Rutheford, New Jersey, and combined with 115 ml. of anhydrous methanol. In a separate flask 1 ml. of acetyl chloride is dissolved in 8 ml. of methanol whereby an HCl-methanol solution is formed. The resulting HCl solution is then added to the 3-phenyl-4-pentenal solution (total volume:125 ml.). After a period of two hours, the resultant reaction mixture is decanted from the molecular sieves, evaporated and distilled at a pressure of 0.5 mm. Hg. and a temperature in the range of 72°–73°C. The distillate is 3-phenyl-4-pentenal dimethyl acetal.

The NMR data is as follows:

| ppm | | | Interpretation |
|---|---|---|---|
| 7.20 | (m) | 5H | Aryl protons |
| 6.20 – 5.76 | (m) | 1H | Olefinic proton |
| 5.10 – 4.94 | (m) | 2H | Olefinic protons |
| 4.21 | | 1H | Acetal proton |
| 3.44 – 3.24 | (m) | 7H | Protons α to oxygen and aryl—CH— |
| 1.98 | (t) | 2H | Aryl—C—CH$_2$— |

EXAMPLE II

Preparation of 3-phenyl-3-pentenal dimethyl acetal 15 grams of the 3-phenyl-4-pentenal dimethyl acetal produced in the immediately preceding Example is dissolved in dimethyl sulfoxide (total volume 50 ml.) and 1.5 grams of potassium-t-butoxide is added. The mixture is then stored at room temperature under a nitrogen blanket for a period of 1½ hours. The reaction mass is then diluted with 50cc of water and is extracted with two 100 ml. portions of diethyl ether. The diethyl ether extract is dried over anhydrous sodium sulfate and evaporated down. The resulting residue contains a 2:1 mixture of 3-phenyl-3-pentenal dimethyl acetal and 3-phenyl-4-pentenal dimethyl acetal. The resulting mixture is then retreated with potassium-t-butoxide in dimethyl sulfoxide and again worked up as above. Removal of solvent yields 14.9 grams of a quite mobile orange oil. The reaction product is distilled at 83°C and 0.1 mm. Hg. pressure in a concentric tube distillation apparatus, yielding 3-phenyl-3-pentenal dimethyl acetal.

The NMR data for this compound is as follows:

| ppm | | | Interpretation |
|---|---|---|---|
| 7.40 –7.20 | (m) | 5H | Aryl protons |
| 5.80 | (q) | 1H | Aryl-C=$\overset{H}{\overset{|}{C}}$—CH$_3$ |
| 4.33 | (t) | 1H | Acetal proton |
| 3.24 | (s) | 6H | CH$_3$ — 0 — |
| 2.83 | (d) | 2H | Aryl-$\overset{H}{\overset{|}{C}}$—CH$_2$—O— |
| 1.82 | (d) | 3H | $\overset{H}{\overset{|}{C}}$=C—CH$_3$ |

EXAMPLE III

Preparation of 3-Phenyl-2-Pentenal

Into a 100 ml. flask the following ingredients are added:

| Ingredients | Quantity |
|---|---|
| Piperidine | 10.0 ml. |
| Diethyl ether | 10.0 ml. |

62.5 ml. of a 1.6 N butyl lithium solution in hexane is added dropwise. After the addition 12.5 grams of the Schiff base of acetaldehyde and cyclohexylamine (boiling point 52°–56°C at 20 mm.Hg. pressure) having the structure:

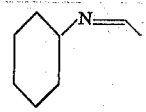

is added as a solution in 20 ml. of diethyl ether. The resulting mass is maintained at approximately 0°C with the use of an ice bath. After about 15 minutes, the reaction mass is cooled in a dry ice — isopropyl alcohol bath and 9.0 ml. propiophenone is added dropwise. The reaction mass is stored overnight at room temperature under a blanket of nitrogen. 150 ml. of water is then added to the reaction mass with stirring yielding a two-phase reaction mass: an aqueous phase and an organic phase. The organic phase is separated and dried over anhydrous sodium sulfate and evaporated down to an orange oil. The said oil is admixed with 50 grams of oxalic acid dissolved in 150 ml. The resulting mixture is steam distilled for a period of two hours. Both the residue and steam distillate are extracted with 200 ml portions of diethyl ether and the ether extracts are combined, dried over anhydrous sodium sulfate and evaporated down yielding 7.34 grams of an orange oil. This material contains both the cis- and trans-isomers of 3-phenyl-2-pentenal, which are isolated in admixture by means of preparative gas-liquid chromatrography.

EXAMPLE IV

Preparation of 3-phenyl-3-pentenal 2.3 grams of 3-phenyl-3-pentenal dimethy acetal produced by the procedure set forth in the immediately preceding Example is stirred for a period of 16 hours with a solution of 10 ml. water and 1 ml. concentrated hydrochloric acid. The reaction mass is extracted with two 25 ml. portions of diethyl ether. The diethyl ether extracts are then combined and washed with a saturated sodium carbonate solution, dried over anhydrous sodium sulfate and evaporated down leaving 1.8 grams of a light yellow oil. Isolation of the major component of this oil by preparative gas-liquid chromatography yielded 3-phenyl-3-pentenal.

EXAMPLE V

A tobacco flavoring formulation is prepared by admixing the following ingredients:

| Ingredients | Parts |
|---|---|
| 3-Phenyl-2-pentenal | 20 |
| Eugenol | 5 |
| Celery seed oil | 4 |
| Bergamot oil Italy | 3 |
| Nutmeg oil E.I. | 4 |
| Origanum oil | 5 |
| Dipentene | 20 |
| Absolute ethanol | 39 |

This material is added to smoking tobacco at the rate of ⅛–¼ percent of the weight of the tobacco. The use of 3-phenyl-2-pentenal imparts to the overall spice flavor of the tobacco an excellent desirable cinnamon-like aroma.

EXAMPLE VI

A tobacco flavoring formulation is prepared by admixing the following ingredients:

| Ingredients | Parts |
|---|---|
| 3-Phenyl-3-pentenal | 20.00 |
| 3-Hydroxy-2-methyl-4-pyrone | 1.50 |
| Gamma undecalactone | 1.50 |
| Benzaldehyde | 2.00 |
| Amyl acetate | 2.00 |
| Ethyl butyrate | 5.00 |
| Ethyl acetate | 10.00 |
| Hexen-2-ol-1 | 1.00 |
| Absolute ethanol | 57.00 |

This material is added to smoking tobacco at the rate of ⅛–¼ percent of the weight of the tobacco. The use of the 3-phenyl-3-pentenal provides to the tobacco an excellent desirable fruity aroma which is more full bodied than if the above-mentioned flavoring formulation did not contain the 3-phenyl-3-pentenal.

What is claimed is:

1. The method of making an organoleptically improved smoking tobacco product which comprises applying to the product an aroma and flavoring additive which includes as an active ingredient a material selected from the group consisting of 3-phenyl-3-pentenal and 3-phenyl-2-pentenal said flavoring additive being present in amount of from 0.01 up to 0.40 percent by weight of the smoking tobacco.

2. The method of making an organoleptically improved smoking tobacco product as set forth in claim 1 wherein said active ingredient is 3-phenyl-3-pentenal.

3. The method of making an organoleptically improved smoking tobacco product as set forth in claim 1 wherein said active ingredient is 3-phenyl-2-pentenal.

* * * * *